Patented Oct. 2, 1923.

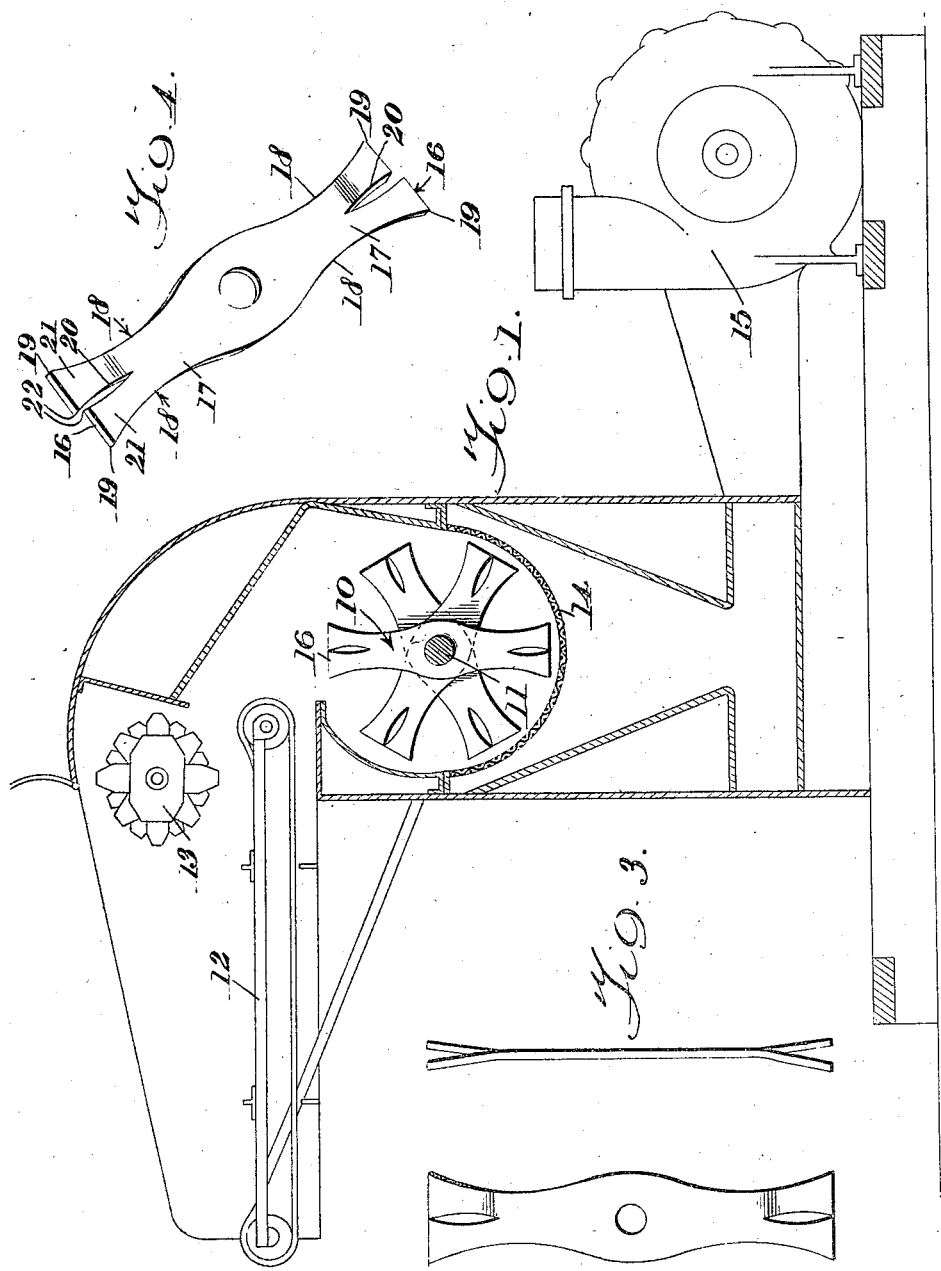

1,469,510

UNITED STATES PATENT OFFICE.

JOSEPH HOCHENAUER, OF PUEBLO, COLORADO.

CUTTER FOR FORAGE AND GRAIN GRINDERS.

Application filed March 26, 1923. Serial No. 627,817.

*To all whom it may concern:*

Be it known that I, JOSEPH HOCHENAUER, a citizen of the United States, and a resident of Pueblo, in the county of Pueblo and State of Colorado, have invented certain new and useful Improvements in Cutters for Forage and Grain Grinders, of which the following is a specification.

My present invention relates generally to apparatus for grinding forage and grain, and more particularly to that type of apparatus in which a series of cutters are disposed at various angles upon a lengthwise shaft for operation above a semicylindrical screen. The outer ends of the cutters actively operate upon the material to be ground and force the ground material through the interstices of the screen. More especially my invention relates to that type of cutter which has square ends and is formed of a flat strip of metal with concavely curved sides whereby cutting edges are formed at opposite sides of the square ends, and my object is to improve cutters of this type in certain respects whereby the number of cutting edges may be materially increased and the efficiency and effectiveness of the cutter materially enhanced as a result thereof.

In the accompanying drawing which illustrates my present invention and forms a part of this specification, Figure 1 is a vertical longitudinal section through a forage and grain grinder illustrating the practical application of my invention.

Figures 2 and 3 are respectively a face and an edge view of one of the cutters, and Figure 4 is a perspective view of one of the cutters.

Referring now to these figures I have shown in Figure 1 a form of forage and grain grinder in which the material is fed to the cutting cylinder formed of a plurality of blades 10 upon a shaft 11, by means of a feed belt 12 and preliminary feeding cutters 13, the cut or ground forage or grain being forced by the cutting cylinder including the blades 10, downwardly through the interstices of a semicylindrical screen 14 and being finally withdrawn as for instance by means of a blower generally indicated at 15.

It is to the cutters 10 of the series disposed on the main cutting shaft 11 to which my invention particularly relates, it being noted that these cutters are of that type having square ends 16 at the opposite ends of its oppositely projecting blades 17 and that these blades have slightly concaved sides 18 so as to form acute cutting edges 19 at opposite sides of the square ends 16.

My invention aims to increase the number of cutting edges of each blade and to this end proposes a cutter having blades whose outer portions are split lengthwise as at 20, inwardly from the square ends 16 for a short distance so as to thus bifurcate the blades, leaving furcations 21 which upon each blade are deflected in relatively opposite directions and at angles with respect to the plane of the blade body.

It will also be noted that in splitting or bifurcating the outer ends of the blades, each of the furcations 21 is given a concave curvature along its inner side corresponding to the concaving of its outer side edge so that as a result thereof each blade is provided with cutting edges 22 at the inner sides of the square end of its furcations, supplementing its usual outer cutting edges 19.

In this way I provide a cutter of greatly increased effectiveness and efficiency over the usual blade, without materially decreasing the normal and natural strength thereof.

I claim:

A cutter for feed and grain grinders and the like having oppositely projecting blades, each blade provided with a square end and concave sides forming cutting edges at opposite sides of said end, the outer portion of each blade being bifurcated longitudinally through the end thereof and having its furcations oppositely and laterally deflected and concavely curved along the inner sides thereof, forming cutting edges at the inner sides of the ends of the furcations and permitting the latter to readily clear themselves in action.

JOSEPH HOCHENAUER.